Inventor
John D. Goodlaxson
by James S. Nettleton
Attorney

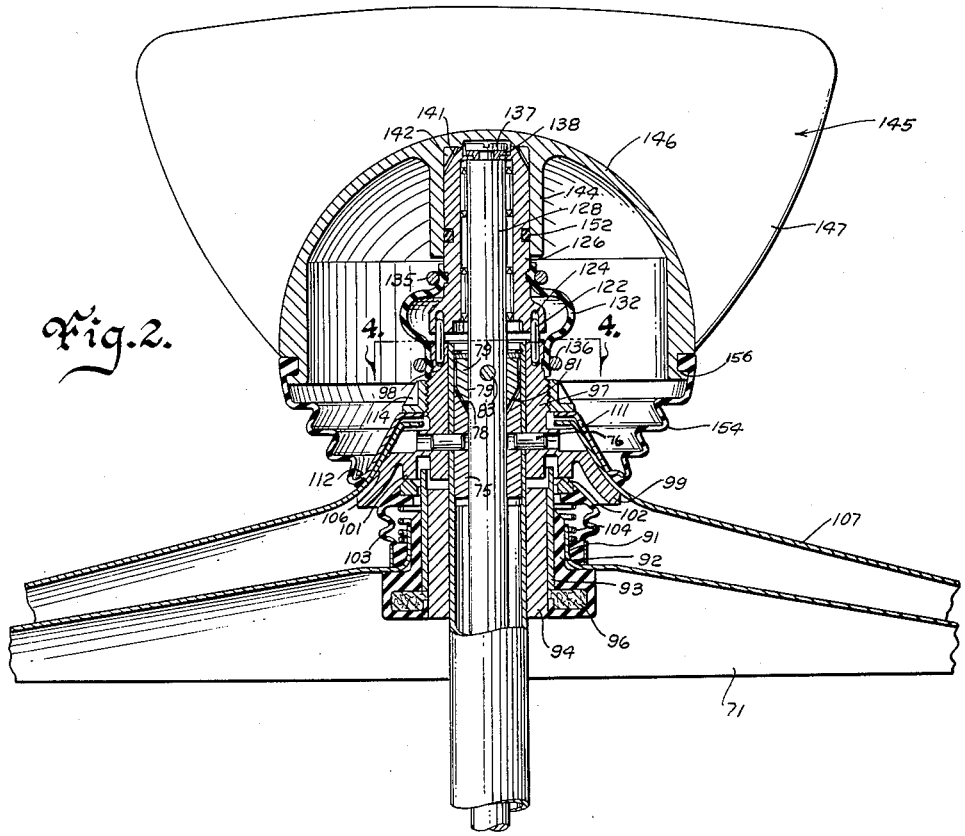
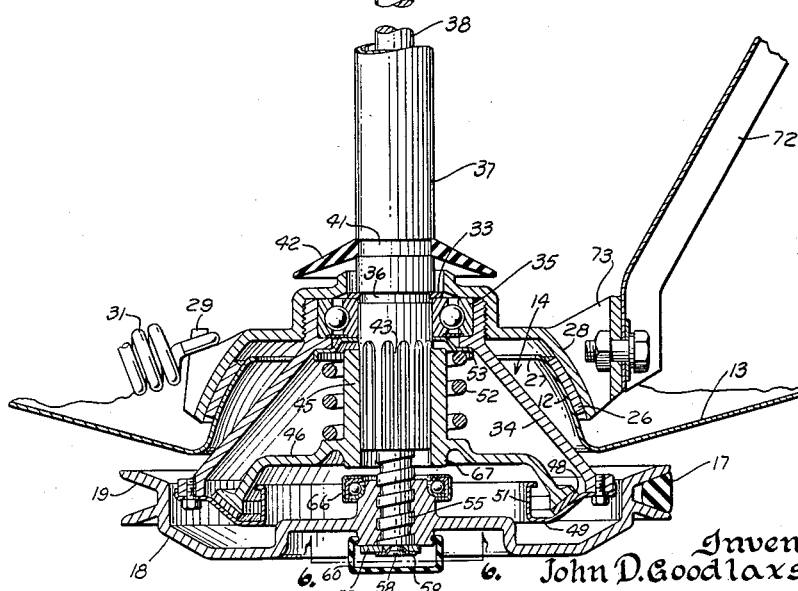
Fig. 2.
Inventor
John D. Goodlaxson
by James S. [signature]
Attorney Dec. 19, 1961  J. D. GOODLAXSON  3,013,645
DRIVE ASSEMBLY
Filed Oct. 28, 1957  7 Sheets-Sheet 3
Fig.3.
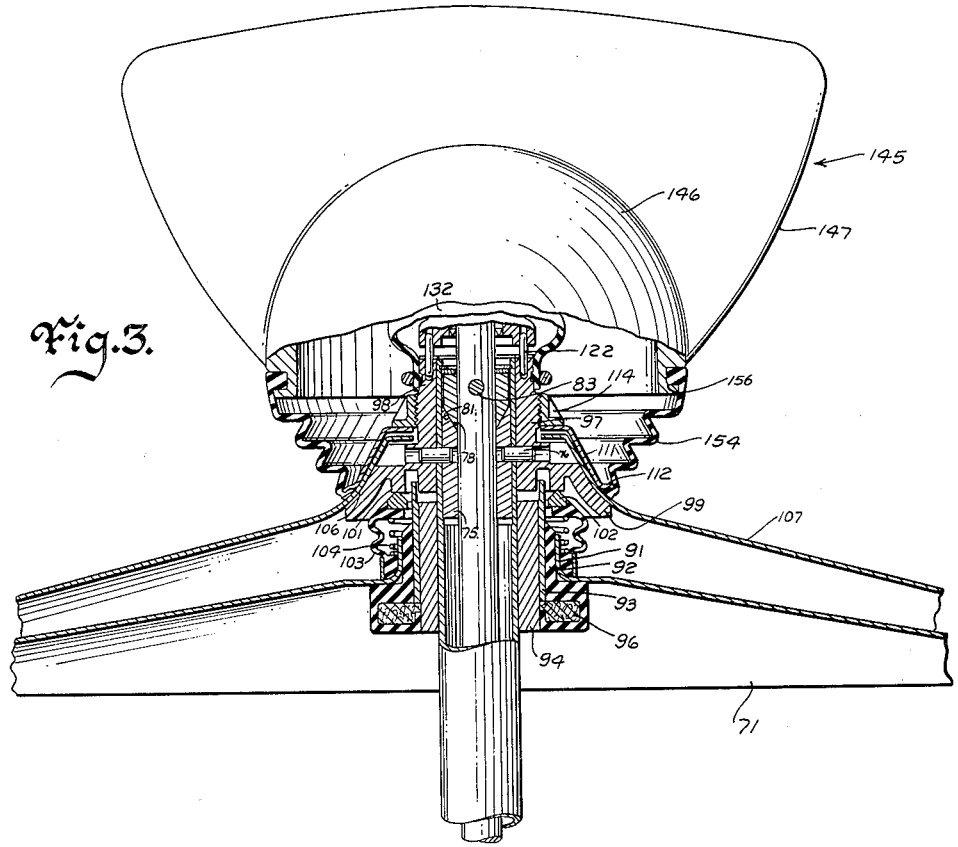
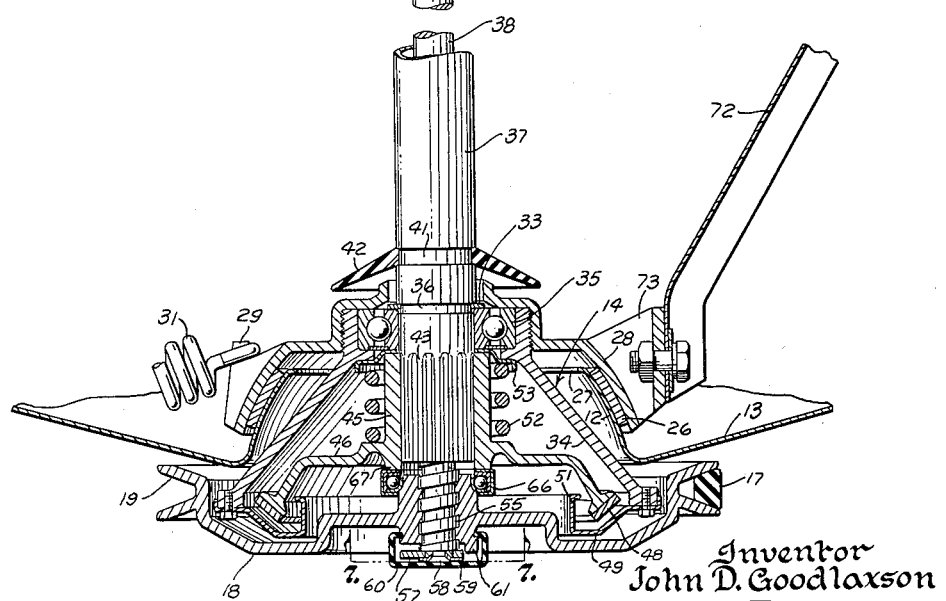
Inventor
John D. Goodlaxson
by James S. Nittleton
Attorney Dec. 19, 1961     J. D. GOODLAXSON     3,013,645
DRIVE ASSEMBLY
Filed Oct. 28, 1957     7 Sheets-Sheet 4

Dec. 19, 1961 J. D. GOODLAXSON 3,013,645
DRIVE ASSEMBLY
Filed Oct. 28, 1957 7 Sheets-Sheet 5

Inventor
John D. Goodlaxson
by James L. Nettleton
Attorney

Dec. 19, 1961   J. D. GOODLAXSON   3,013,645
DRIVE ASSEMBLY
Filed Oct. 28, 1957   7 Sheets-Sheet 7

Inventor
John D. Goodlaxson
by James L. Nettleton
Attorney

United States Patent Office 3,013,645
Patented Dec. 19, 1961

3,013,645
DRIVE ASSEMBLY
John D. Goodlaxson, Colfax, Iowa, assignor to The Maytag Company, Newton, Iowa, a corporation of Delaware
Filed Oct. 28, 1957, Ser. No. 692,923
11 Claims. (Cl. 192—18)

This invention relates to a drive assembly for an automatic washing machine and represents an improvement of the invention disclosed and claimed in the copending application, Serial No. 505,231, filed May 2, 1955, naming John D. Goodlaxson as inventor, and assigned to the assignee of the instant invention. Said copending application can be further identified as Patent No. 2,948,372 issued August 9, 1950.

Like the device disclosed in that prior application, the invention of this application provides a means for selectively driving an agitator during a washing operation for rotating a clothes receptacle at a high speed during the centrifugal extraction operation as determined solely by the direction of the rotation of the reversible motor powering this drive assembly.

In the instant case, rotation of the drive assembly input pulley in one direction causes that pulley to spiral downwardly on a helix formed on the end of the central drive shaft until the pulley abuts a stop member thereby creating a positive rotary drive to power the agitator operatively connected to that central shaft. The downward movement of the pulley also permits a brake rotor splined to the spin shaft journalling this center shaft to seat against a stationary brake stator surface under the action of a brake spring to prevent the spin shaft from rotating during the washing operation.

Rotation of the input pulley in the opposite direction during the centrifugal extraction operation causes it to climb the helix and lift the brake rotor away from the brake stator surface against the bias of the brake spring thereby freeing the spin shaft and the clothes receptacle for rotation. Upward travel of the pulley against the force of this brake spring continues until a state of equilibrium is reached for the forces acting on the input pulley.

Since the movement of the brake rotor upwardly away from the brake stator is opposed by the large brake spring, the reactionary forces produced between the spin shaft carrying the brake rotor and the center shaft carrying the pulley act in opposite directions between these concentric shafts. By providing clutch surfaces connected to the center shaft and the spin shaft, respectively, it is possible to clutch these members together during the extraction opertaion by the forces produced by the separation of the brake rotor from its brake stator thereby coupling the center shaft to the spin shaft to produce the desired high speed rotation of the clothes receptacle connected to the spin shaft.

The device forming the invention of this case operates on a somewhat different clutching principle than that disclosed in my previously identified copending application. This instant device eliminates a clutch plate utilized in the earlier device and produces a quieter, positive, more economical and more satisfactory drive assembly than that disclosed in that prior application.

In the accompanying drawings:

FIGURE 2 is an enlarged fragmentary view, partially broken away showing the drive assembly illustrated in FIGURE 1 in its agitate position together with the wobble type agitator driven by that assembly;

FIGURE 3 is an enlarged fragmentary view similar to that of FIGURE 2, with the same parts being shown in the spin position;

Figure 1:
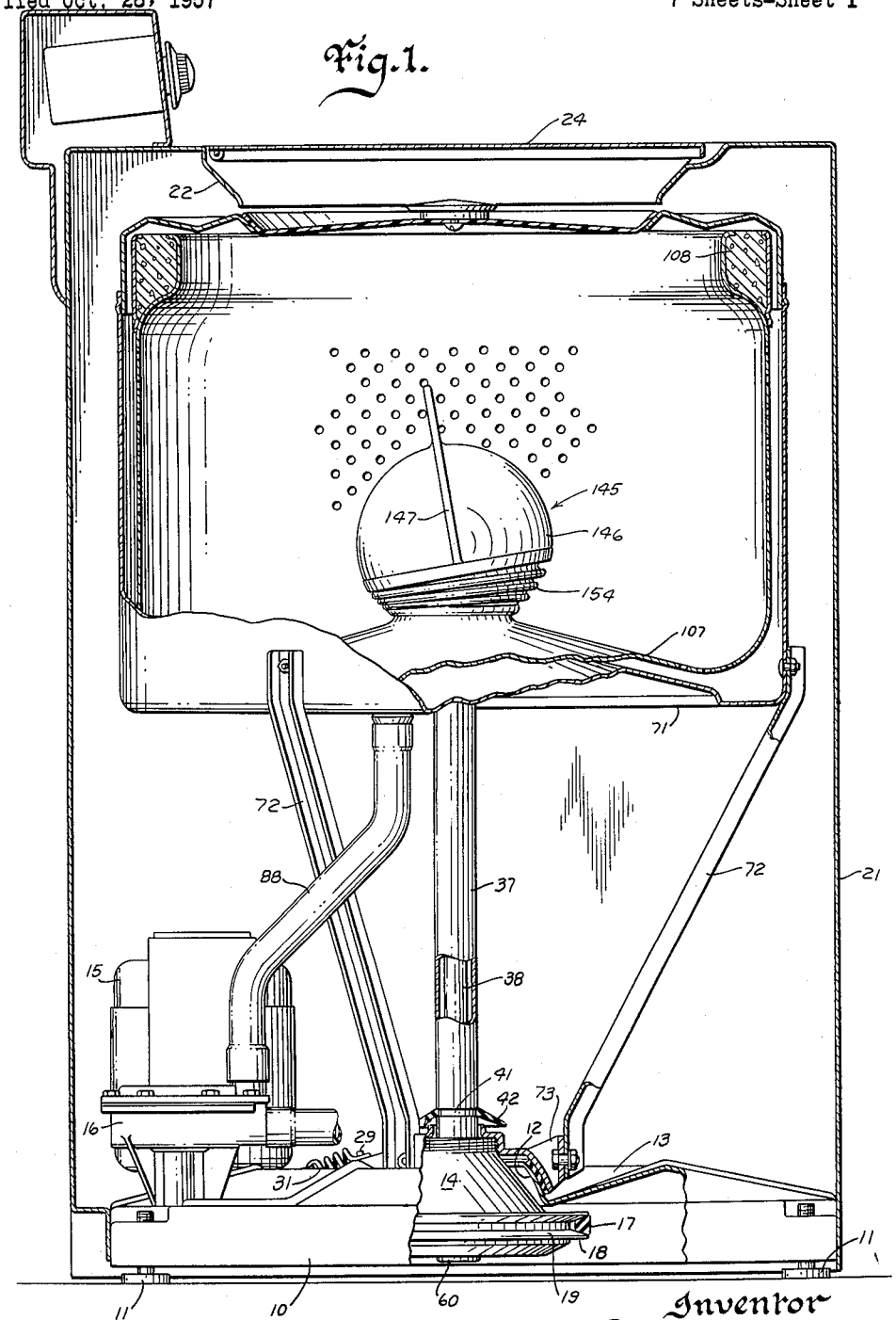
FIGURE 1 is a side elevation, partially broken away, showing a washing machine of the vertical axis type incorporating my invention.
Figure 4:
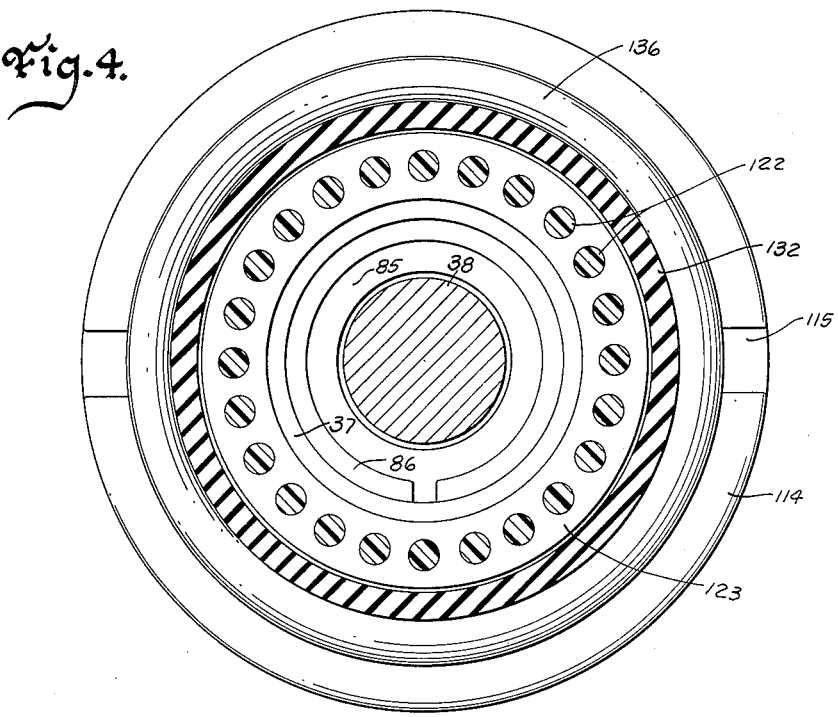
FIGURE 4 is an enlarged cross sectional view taken on line 4—4 of FIGURE 2.
Figure 5:
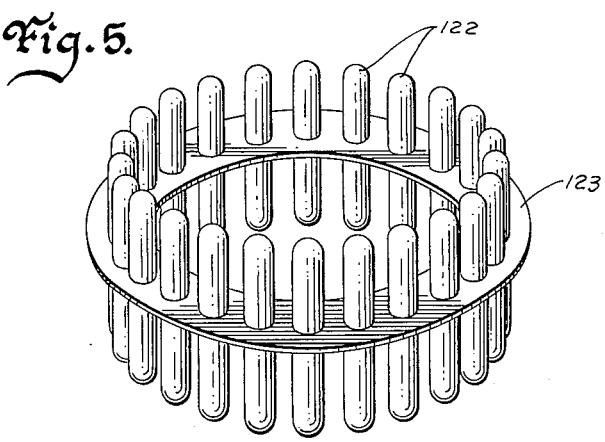
FIGURE 5 is an enlarged perspective view of the ring of agitator restraining pins shown in FIGURES 2, 3 and 4.

In the accompanying drawings, base frame 10 is shown mounted on adjustable feet 11 and is provided with a truncated supporting dome 12 which rises out of a centrally located concave depression 13 formed in base frame 10. Dome member 12 serves as the mounting which supports both the tub assembly and the drive assembly for the machine shown in the accompanying figures.

Base frame 10 also supports the upended reversible motor 15 and the water pump 16 which, like the drive assembly 14, is driven by the motor 15 through belt 17 by a separate pulley (not shown) mounted on the underside of base frame 10. Numeral 19 designates the groove of pulley 18 which serves as the input member for the drive assembly 14.

Cabinet 21, which is attached to and encloses base frame 10 together with the drive and tub assemblies supported thereby, is provided at its upper end with a depending annular flange 22 defining an access opening into the washing machine apparatus which is normally covered by the access door panel 24.

Dome 12 is provided with a plurality of friction pads 26 on its periphery adjacent the opening 27 located in the uppermost portion of that dome member. An inverted bowl-like support member 28 rests on these friction pads 26 and is provided with three equally spaced ears 29 for the three centering springs 31 which are fastened between ears 29 and the base frame 10. This arrangement centers support member 28 on dome 12 and restrains it from rotation relative to base frame 10.

Threaded into the underside of the support member 28 is a member 34 of substantially frusto-conical configuration which serves as a housing for the drive assembly 14. The housing member 34 cooperates with the support member 28 by gripping the outer race of a thrust bearing 35 which supports the tubular spin shaft 37 by means of the thrust ring 33 positioned in the annular recess 36 in shaft 37 and seated on the inner race of bearing 35.

The spin shaft 37 journals the concentric power shaft 38 which extends into the drive assembly 14 and, as will be more apparent hereinafter, is ultimately supported by spin shaft 37 and the bearing 35. With this construction, all weight placed upon the spin shaft 37, housing 34 and upon the support member 28 may be used to an advantage to provide ample frictional forces between member 28 and the friction pads 26 for damping nutational movements of the shafts 37 and 38 relative to dome 12 while permitting rotational movement of spin shaft 37 in thrust bearing 35.

The spin shaft 37 is provided with an annular recess 41 receiving the fluid deflector member 42 which prevents fluids draining down shaft 37 and entering the upper part of drive assembly 14. Shaft 37 is also provided at its lower end with splines 43 which receive the mating splined hub 45 of the brake rotor member 46. Other equivalent keyed constructions may also be used to permit relative axial movement of rotor 46 on shaft 37 while preventing relative rotation between these members.

The beveled periphery of brake rotor member 46 is surfaced with a friction material 48 such as cork and is capable of engaging the brake stator plate 49 bolted to the lower edge of the housing member 34. The stator plate 49 also includes an upturned inner flange 51 defining a small reservoir for retaining a small quantity of lubricant to prevent squeaking of the cork material 48 on the aluminum stator plate 49 without materially affecting the desired braking action between these surfaces.

The cork friction material 48 carried on the brake rotor 46 is urged against the brake stator plate 49 by means of the large coil spring 52 which encompasses the splined hub 45 of rotor 46 and is compressed between a shouldered portion of brake rotor 46 and a washer-like spring retainer member 53 near the upper portion of housing 34. From this it will be seen that when rotor member 46 engages the stator 49, spin shaft 37 and all members affixed to that latter tube will be restrained against rotation by means of the braking action occurring between members 46 and 49.

The lower end of the center drive shaft 38 extends beyond the lower end of the spin shaft 37 and is provided with a right hand helix 55 on which the drive pulley 18 is threaded. The center shaft 38 is also splined at its lower end to receive a splined dog or projection 57 which is maintained in its axial position relative to shaft 38 by means of the flat head machine screw 58 extending through the serrated countersunk center portion of washer 59. Dog 57 is adapted to cooperate with a segmental lug 61 which depends from the hub of pulley 18 serving as the power input member for the drive assembly 14 as shown in detail in FIGURE 6. The snap-on rubber dust cover 60 protects helix 55, pulley 18 and the driving connections between these members from impairment by foreign particles.

Figure 6:
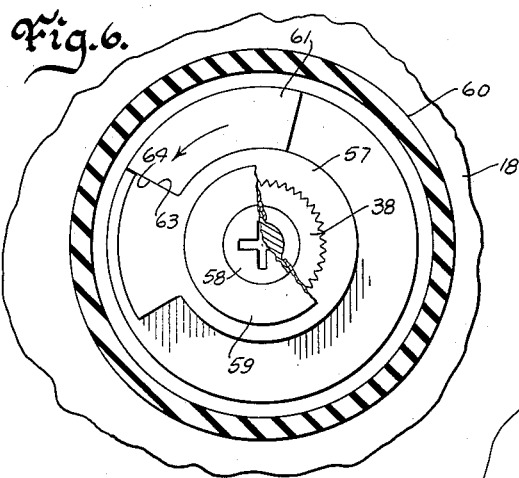
FIGURE 6 is an enlarged fragmentary view taken on line 6—6 of FIGURE 2 showing the power input drive connections in the agitate position.

During the agitation periods when pulley 18 has rotated in a counterclockwise direction as viewed from the bottom of FIGURE 2, the surface 64 of depending lug 61 abuts surface 63 of dog 57 in a positive driving engagement as shown in FIGURE 6 and limits downward travel of pulley 18 on the helix 55. However, in the centrifugal extraction operation when pulley 18 is reversed and rotated in a clockwise direction, upward travel of pulley 18 is independent of any cooperation between dog 57 and lug 61 as is apparent from an inspection of FIGURES 3 and 7, and is dependent upon the effects of the engagement between the thrust bearing assembly 66 carried by the hub of pulley 18, and the boss 67 of the brake rotor member 46. These effects will be understood after an inspection is made of the cooperation between the upper ends of shafts 37 and 38.

Coaxial shafts 37 and 38 both extend upwardly through and into an outer tub member 71 which is supported on the inverted tripod formed by the three brace members 72 connected to lug members 73 formed integrally with support member 28. Since the support member 28 is restrained against rotation by reason of its connection to the centering springs 31, the outer tub member 71 is likewise prevented from any rotational movement by means of its connection to this tripod support. It should be apparent from this description and from an inspection of FIGURE 1 that the three equally spaced centering springs 31 are 120 degrees apart with each of the three equally spaced lugs 73 being positioned midway between adjacent ears 29.

It will be seen from an inspection of FIGURES 2 and 3 that the upper end of the spin shaft 37 is provided with a porous oil impregnated bearing member 75 which receives the center shaft 38 and is maintained in place of the cross pins 76 penetrating the spin shaft 37. Bearing member 75 is provided with a countersunk upper face 78 which serves as a combined thrust surface and clutch surface for the thrust collar 79 having a conical surface 81 mating with the countersunk face 78. During the agitation operations, surface 81 contacts and rotates on surface 78 but during the fluid extraction operations, these surfaces are frictionally clutched together by the application of thrust forces to the shafts 37 and 38 to provide a cone clutch activated by movements of drive assembly 14. Thrust collar 79 is pinned to the center shaft 38 by means of the cross pin 83 to limit its downward axial travel relative to spin shaft 37 while the washer 85 and its adjacent expansible ring 86 carried in an annular recess near the upper end of spin shaft 37 limits the upward travel of thrust collar 79 and shaft 38 relative to spin shaft 37 as shown most clearly in FIGURE 8.

Tub 71, which communicates with the water pump 16 through the drain hose 88, is provided with a centrally located opening formed in its bottom wall by the upturned flange 91. Flange 91 receives in an interference fit the rubber mounting sleeve 92 which is bonded to the steel sleeve 93 which in turn retains the porous sintered metal bearing 94 by means of a squeeze fit. The porous bearing 94, which journals and lubricates shafts 37, is contiguously encircled by the lower portion of the rubber sleeve 92 carrying an oil reservoir filled with wicking material 96 which supplies lubricant to the spin shaft 37.

Affixed to the upper end of the spin shaft 37 by means of the outer ends of cross pins 76 is the clothes receptacle carrier or mounting hub 97 which is provided with a mounting stem 98, a tapered receptacle supporting flange 99 and a depending annulus 101. The lower end of annulus 101 defines a bearing surface which is abutted by the carbon nose ring 102 which is sealed to and forms part of the boot seal 103 clamped to the outer periphery of the upturned flange 91. The nose ring 102 is pressed upwardly into a sealing engagement with the annulus 101 by means of the coil spring 104 which is mounted concentrically within the boot seal 103.

The tapered supporting flange 99 mates with and supports a cooperating reentrant central portion 106 of the perforate clothes receptacle 107 provided with an inertia ring 108 on its upper rim. A clamp washer 111 having a rolled periphery 112 presses reentrant portion 106 against the mounting flange 99 when the large clamp nut 114 threaded on mounting stem 98 is turned tightly against the clamp washer 111. The clamp nut 114 is shown as being provided with diametrically opposed recesses 115 to accommodate a spanner wrench for tightening nut 114 into this position. This clamping assembly provides a unitary connection between clothes receptacle 107 and the spin shaft 37 so that any movements imparted to this latter shaft will also be transmitted to the clothes receptacle 107.

Figure 8:
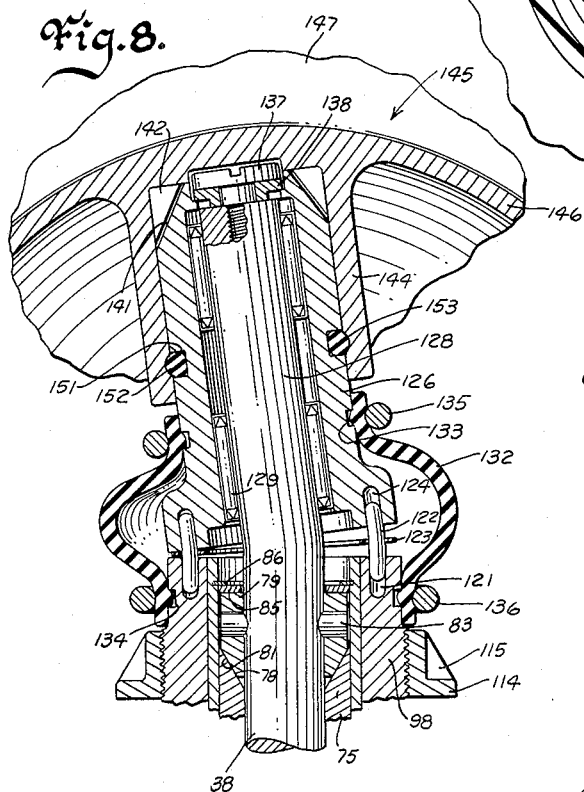
FIGURE 8 is an enlarged fragmentary sectional view showing the flexing of the agitator restraining pins during the rotation of the bent extension of the agitator drive shaft.

The upper face of the mounting stem 98 is provided with a plurality of blind ended holes 121 positioned concentrically with respect to shaft 38 with their axes being parallel to each other and to that of the latter shaft as is apparent from FIGURE 8. These holes 121 receive the lower half of the yieldable agitator restraining pins 122 which are preferably formed of tough, flexible plastic in a one-piece construction with the flat washer-like connector ring 123 interconnecting all of the pins 122 to facilitate manufacturing and assembling operations. The upper ends of pins 122 are received in the mating holes 124 of the bearing retainer member 126 which serves as the agitator mounting stem. Both sets of holes 121 and 124 are deep enough to provide end clearance for pins 122 to accommodate the wobbling movement imparted to the bearing retainer member 126 by rotation of the bent shaft portion 128.

Shaft portion 128 constitutes an extension of the center shaft 38 and is oblique to the rotational axis of that drive shaft. The oblique portion 128 is journalled in the needle bearings 129 carried within the bearing retainer member 126.

Figure 9:
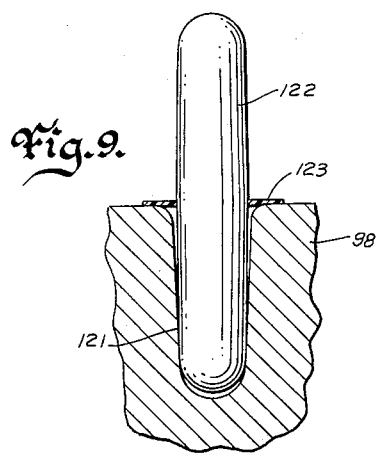
FIGURE 9 is an enlarged fragmentary view showing the relationship between one of the agitator restraining pins and a socket receiving one end of that pin.

Pins 122, which may also be separately formed of spring steel, etc., are rigid enough to resist the torsion created by the tendency of bearing retainer member 126 to rotate relative to mounting stem 98 during rotary movement of shaft 38 but are flexible enough to permit a wobbling movement of bearing retainer 126 to take place relative to the mounting stem 98. As apparent from FIGURE 9, pins 122 are slightly tapered to a narrower end diameter while holes 121 are likewise tapered toward a smaller bottom diameter to reduce the tendency for binding of these parts during the wobbling movements of retainer member 126. The upper ends of pins 121 are also tapered and are received by holes 124 formed with the taper similar to that of holes 21 to reduce binding between members 122 and 126. In addition, holes 121 and 124 are thoroughly lubricated by the lubricant normally retained within the bulbous seal member 132 to further facilitate their cooperation with pins 122. This lubricant also tends to maintain surfaces 78 and 81 in a lubricated condition.

A watertight seal between the mounting stem 98 and bearing retainer member 126 for the protection of the central shaft structure is produced by the bulbous seal 132 which is pressed into the grooves 133 and 134 of members 126 and 98, respectively, by the encircling clamp members 135 and 136.

The top central portion of the bearing retainer member 126 is drilled and counterbored to receive the thrust washer insert member 138 which journals the upper shank of the shouldered screw 137 threaded into the end of the shaft portion 128 with its shoulder seated tightly against the upper surface of that shaft portion 128 to provide the necessary axial clearance for member 138 (FIGURE 8) while preventing separation of mounting stem 126 and mounting hub 97. Washer member 138 serves as a bearing insert in member 126 which has a slotted upper surface (not shown) for receiving mating lugs (not shown) depending from the bottom of washer 138 to prevent the latter member from turning relative to bearing retainer member 126. By preventing washer 138 from rotating within bearing retainer member 126 relative movement occurs only between the top bearing surface of washer member 138 and the lower surface of the head of screw 137 during the rotation of shaft 38.

The upper end of bearing retainer 126 is provided with four equally spaced diagonal kerfs 141 cut in the upper end of that member. These kerfs 141 receive the four mating webs or fillets 142 formed integrally with hub 144 of the agitator 145 which, in this illustrative embodiment, is provided with a hemispherical base portion 146 and an upstanding vane 147. This construction prevents the agitator 145 from rotating relative to bearing retainer member 126 during the rotation of the center shaft 38.

An annular recess 151 is provided in member 126 in order to anchor agitator 145 on bearing retainer member 126 after agitator 145 has been slipped over the latter member. This recess 151 carries an expansible O-ring seal 152 whose periphery presses outwardly into a mating annular groove 153 formed in hub 144 once agitator 145 has been slipped into place over bearing retainer member 126.

This construction seals the hub of 144 of agitator 145 and bearing retainer member 126 together while preventing axial movement of agitator 145 relative to bearing retainer member 126 during the rotation of shaft 38. It also provides a quick method of disassembling this agitator assembly by allowing ready access to the central shaft structure once a clothes shielding bellows member 154 has been unsnapped from under the rolled periphery 112 of clamp washer 111 or out of the peripheral groove 156 carried in the hemispherical base portion 146 of agitator 145.

In operation, rotation of drive motor 15 in the direction to rotate the pulley 18 in the counterclockwise direction as viewed from the bottom of FIGURE 2 causes pulley 18 to spiral downwardly on the helix 55 until surface 64 of the depending lug 61 carried by pulley 18 abuts surface 63 of the dog 57 carried on the lower splined end of center shaft 38 as shown in FIGURE 6. Further rotation of pulley member 18 in this counterclockwise direction creates a positive drive between pulley 18 and center shaft 38 in this counterclockwise direction while the spin shaft 37 is restrained against rotation by the large brake spring 52 which urges brake rotor 46 against the brake stator 49 which, while being moveable relative to dome 12 is nonrotatable and stationary in so far as shaft 37 is concerned. Rotation of shaft 38 in this direction allows the thrust collar 79 to rotate freely within the countersunk face 78 in bearing 75 so that the bent shaft portion 128 describes an inverted cone of revolution with its vertex being located at the intersection of the radii of curvature of the hemispherical base portion 146. Though collar 79 actually constantly contacts and slides on face 78 during the relative movement between surfaces 78 and 81, an exaggerated spacing is shown between these surfaces in FIGURE 2 to clarify this function of operation.

This movement of shaft 38 causes the bearing retainer member 126 to follow a similar cone of revolution in a gyratory action as pins 122 slide in and out of holes 121 and 124 to restrain member 126 from any rotational movement. In practice, seal 132 has been packed with lubricant to reduce the frictional resistance to this wobbling movement of member 126. The movement of bearing retainer 126 is transmitted directly to agitator 145 to produce a wobbling movement of the upstanding vane 147 to effect the desired cleansing action of the fabrics carried within the receptacle 107.

Since the wobbling movement of the hemispherical base portion 146 takes place about the center point determined by the intersection of its radii of curvature, little or no rotational movement from his base portion, except that due to frictional drag, is transmitted to the water contained within tub 71 during the washing operations. The agitation produced by the wobble agitator 145 is thereby solely dependent upon the movement of the upstanding vane 147 or any other additional fins, skirts or vanes that may be placed upon base portion 146.

The clothes shielding bellows member 154 attached between the hemispherical base portion 146 and the clamp washer 111 includes a number of convolutions to accommodate the wobbling movement of agitator 145 but is formed substantially in the form of a spherical segment so as to continue this spherical form of base portion 146 to the bottom wall of receptacle 107 to minimize the rotational fluid drag effects.

In reversing motor 15 during the centrifugal extraction operations, pulley 18 is also reversed and is rotated in a clockwise direction as viewed from the bottom of FIGURE 3 so that it climbs helix 55 when rotated in this direction. Depending upon the initial angular positioning of lug 57 relative to center shaft 38, pulley 18 may have as much as 180 degrees lost motion before its upward vertical travel causes thrust bearing 66 to abut the boss 67 on brake rotor member 46 and lift the latter member away from stator 49 to free shaft 37 for rotation.

Figure 7:
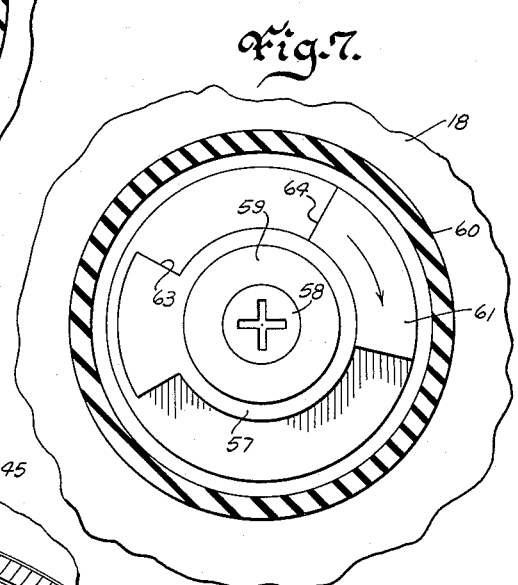
FIGURE 7 is a view similar to that of FIGURE 6 taken on line 7—7 of FIGURE 3 showing the positioning of the same parts in the spin position.

However, in actual practice, dog 57 is angularly positioned on the splined end of shaft 38 so that the pulley 18 rotates only slightly over ninety degrees from the agitate position of FIGURES 2 and 6 to the centrifugal extraction position shown in FIGURES 3 and 7. This latter angular movement includes both the lost motion between parts 61 and 57 and that movement which is necessary for pulley 18 to climb helix 55 in order to effect a desired clutching between shafts 37 and 38. It should therefore be apparent that the clearance shown in FIGURE 2 between parts 66 and 67 is exaggerated to clearly show that relative rotational movement is possible between these parts which are actually in constant contact during all operations.

This angular movement of pulley 18 relative to shaft 38 is made possible by the inertia of the latter shaft and the driving connections to shaft 37 on its upper end. While it is possible that pulley 18 may completely climb helix 55 so that the rotor hub 45 abuts the spring retainer washer 53 adjacent the inner race of thrust bearing 35, the operation of this drive assembly is not dependent upon that degree of vertical travel. It is possible, depending upon the various design characteristics of spring 52 and helix 55, for example, that a state of equilibrium will be reached before rotor 46 is moved that far upwardly on the splined end of spin shaft 37 since it is only necessary to separate rotor 46 from stator 49 to free the spin shaft 37 for rotation and since the clutching of shafts 37 and 38 is dependent upon the forces acting between surfaces 78 and 81, not upon any precise degree of vertical travel of rotor 46.

Since, in actual practice, spring 52 normally urges rotor 46 against stator 49 with a force of approximately two hundred pounds, the additional vertical travel of pulley 18 on helix 55 beyond that necessary to separate members 46 and 49 causes this force plus that produced by the continued compression of spring 52 to be transmitted to shaft 38 through helix 55. The transmission of this force to shaft 38 places the center shaft 38 in tension due to the inability of spin shaft 37 to move downwardly because of the presence of the thrust ring 33 in bearing 35, and causes the conical surface 81 of the thrust collar 79 to bear against the countersunk surface 78 of bearing member 75 with the same force to couple shafts 37 and 38 together.

This causes the clockwise rotary movement transmitted from pulley 18 through the helix 55 to be transmited from shaft 38 to the spin shaft 37 by way of these clutch surfaces to spin receptacle 107 at the centrifuging speed imparted to spin shaft 37. Since the shafts 37 and 38 rotate in unison during this period, no wobbling movement is imparted to agitator 145 which rotates with receptacle 107.

It should be apparent that the camming surfaces presented by helix 55 and those on the mating drive pulley 18 represent only one way in which the power input member 18 is raised and lowered on the vertical axis to separate rotor 46 from stator 49 and simultaneously transfer the force of compression spring 52 from stator 49 to the contiguous clutch surfaces 78 and 81 to effect a coupling of the shafts 37 and 38. These cam surfaces need not be, for the broadest aspect of this invention, positioned on members 18 and 38 in the lower position illustrated in the accompanying drawings. Cam surfaces may be carried, for example, by members 37 and 38 at other more elevated positions with pulley 18 being rigidly affixed to shaft 38.

At the end of the centrifugal extraction operation motor 15 is deenergized causing an interruption in the power supplied to pulley 18. This causes the rotating shafts 37 and 38 to become driving members and results in shaft 38 overrunning pulley 18 with the latter member spiraling downwardly on helix 55 as a result of this relative movement between these members. Spring 52 forces rotor 46 into contact wtih brake stator 49 to quickly terminate rotation of shaft 37 while shaft 38 also ceases to rotate shortly thereafter due to its driving connections to shaft 37 through oblique portion 128.

Figure 10:
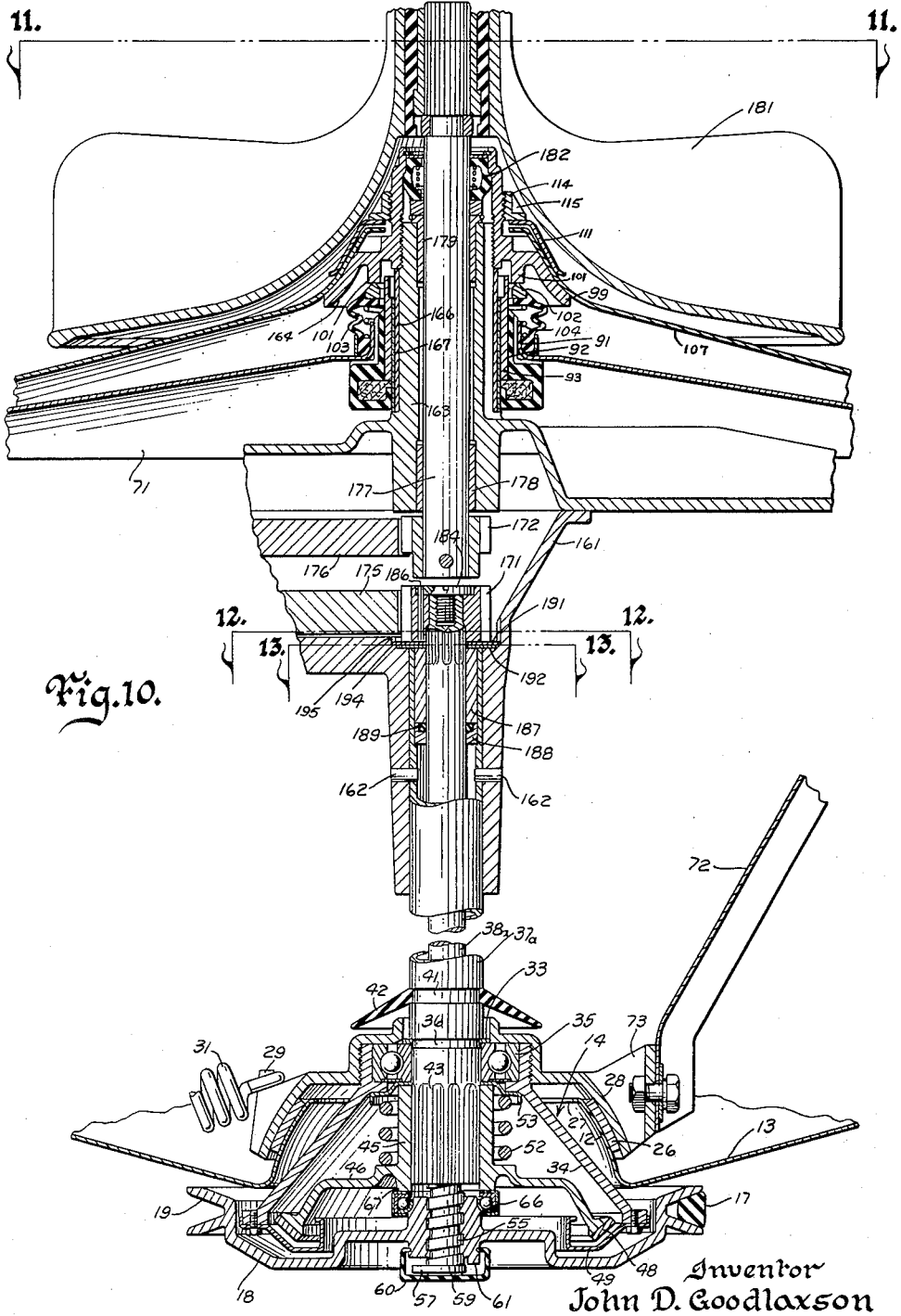
FIGURE 10 is a view similar to that of FIGURE 3 showing a second embodiment of my invention with the parts being shown in the spin position.
Figure 11:
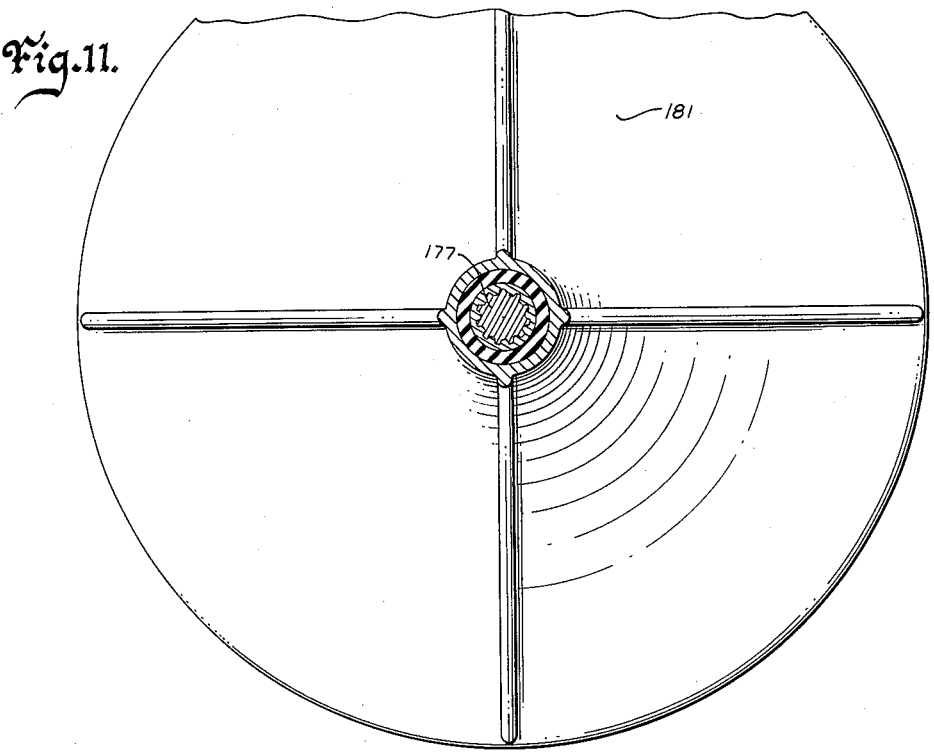
FIGURE 11 is a sectional view taken on line 11—11 of FIGURE 10.
Figure 12:
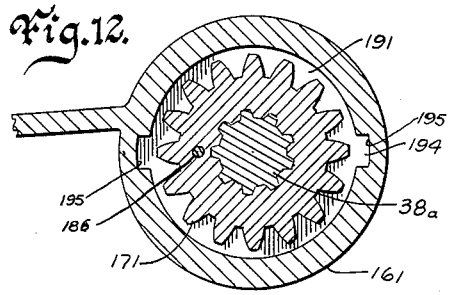
FIGURE 12 is a fragmentary sectional view taken on line 12—12 of FIGURE 10.
Figure 14:
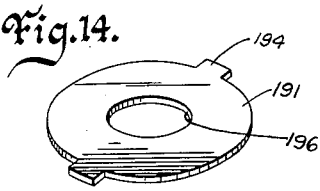
Figure 13:
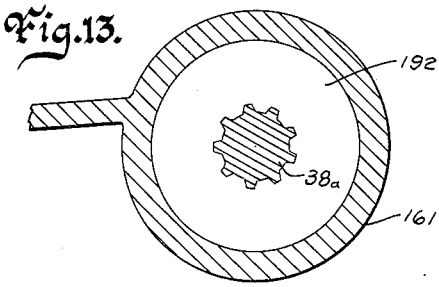
FIGURE 13 is a fragmentary sectional view taken on line 13—13 of FIGURE 10; and, FIGURES 14 and 15 are enlarged perspective views of the clutch washers shown in FIGURE 10.
Figure 15:
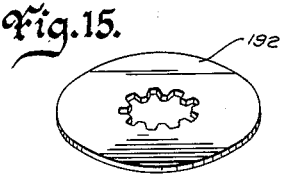

A second embodiment of my invention is shown in FIGURE 10 in which a conventional oscillating type agitator is substituted for the wobble agitator shown in the first embodiment of FIGURES 1-9. In the accompanying figures illustrating the second embodiment of this invention, the same reference numerals are used to designate interchangeable parts between the two devices wherever possible.

For example, a comparison of FIGURES 3 and 10 will indicate the identity of the drive assemblies positioned in the lower portions of these respective sheets of drawings. FIGURE 10, however, shows spin shaft 37a, corresponding to the spin shaft 37 of the first embodiment, as terminating in the counterbalanced gear case 161 to which it is affixed by means of cross pins 162.

The upper part of gear housing 161 includes an upstanding mounting stem 163 which is threaded into the receptacle carrier member 164 supporting the clothes receptacle 107 and which is similar in construction and in function to the carrier member 97 shown in the first embodiment. Carrier member 164 is tightened downwardly against the steel spacer sleeve 166 which abuts the upper surface of gear housing 161 and serves as a bearing surface for the porous tub bearing 167 forming part of the tub bearing assembly which is substantially identical to that shown in the first embodiment. A rigid drive connection is established between spin shaft 37a and the clothes receptacle 107 when the large nut 114 is threaded downwardly against clamp washer 111 so that any movements imparted to spin shaft 37a will also be imparted to the clothes receptacle through gear housing 161 since housing 161 and mounting stem 163 serve as functional extensions of shaft 37a.

The center drive shaft 38a, corresponding to shaft 38 of the first embodiment, is splined on its upper end to receive the drive pinion 171 which forms part of the conventional motion converting mechanism housed within the gear case 161 and which reduces the rotory input from shaft 38a from slightly over 600 revolutions per minute to an oscillatory movement of drive pinion 172 of approximately 52 cycles per minute. The partially illustrated unit enclosed within housing 161 comprises a reduction gear train including the spur gear 175, an eccentric (not shown), a pitman (not shown) and a gear segment 176 which rocks the output pinion 172 at the desired oscillatory rate.

Pinion 172 is pinned to the agitator shaft 177 which is journaled within the bearings 178 and 179 of the mounting stem 163 and which is provided with a splined upper end to receive the agitator 181. The seal assembly 182 prevents water from entering the central shaft structure and draining into the gear housing 161 during operation of this machine.

The input pinion gear 171 splined to the upper end of shaft 38a is recessed to receive the cap screw 184 which is threaded into the end of shaft 38a to prevent any axial movement between shaft 38a and pinion 171. Cap screw 114 is in turn pinned by pin 186 to pinion 171 to prevent its loosening from the latter gear.

The upper end of spin shaft 37a is slightly counterbored to receive a bearing 187 and an annular steel backup member 188 which is seated in this recessed upper shaft portion adjacent bearing 187. Member 188 is itself recessed to receive the O-ring shaft seal 189 positioned between members 187 and 188.

Positioned between the drive pinion 171 and the flush surface formed by gear housing 161, spin shaft 37a and bearing 187 are the two clutch washers 191 and 192. The upper washer 191 is in practice of steel and includes a pair of diametrically opposed ears 194 which are received in a pair of mating recesses 195 formed in the adjacent portions of gear housing 161. Washer 191 also includes a centrally located opening 196 which fits loosely over the splined upper end of the center shaft 38a.

The lower washer 192 which is preferably of some metal dissimilar to that of washer 191 such as phosphor bronze is of circular configuration and is splined to the upper end of shaft 38a so that it rotates with that latter shaft and pinion 171 whenever the shaft 38a is rotated by pulley 18.

It will be apparent that the lower face of pinion 171, which may be of steel or fiber, and the upper surface of this recessed portion of the aluminum housing 161 present clutch surfaces connected to shafts 38a and 37a, respectively. Likewise, the opposite sides of the Phosphor bronze washer 192 and those of the steel washer 191 present additional clutch surfaces connected to these same respective shafts so that movement of pinion 171 toward the lower surface of housing 161 will create an even greater frictional contact between these surfaces than is normally produced by the constant contact of these surfaces by the weight of center shaft 38a and its attached components during the agitation operations. While these surfaces are constantly lubricated by the lubricant retained within gear housing 161, shafts 37a and 38a are clutched together very satisfactorily by means of the illustrated drive assembly.

In operation, this second embodiment functions very similarly to that shown in FIGURES 1–9 in that a counterclockwise rotation of pulley 18 by drive motor 15 as viewed from the bottom of FIGURE 10 causes the latter pulley to spiral downwardly until a positive rotary drive is created between pulley 18 and shaft 38a through elements 57 and 61 as illustrated in FIGURE 6. This rotary movement drives the motion converting unit within gear housing 161, including gear 175, and causes the segmental gear 176 to oscillate the output pinion 172. This oscillatory movement of pinion 172 causes a similar movement of agitator 181 within clothes receptacle 107 while the latter receptacle is restrained from rotation by means of the brake rotor 46 which is pressed by spring 52 against the brake stator 49 and which is splined to the spin shaft 37a connected to receptacle 107 through gear case 161.

During this agitation operation, pinion 171 rotates freely on the upper surface of the steel washer 191 while the Phosphor bronze washer 192 rotates freely between the lower surface of the steel washer 191 and the upper surface of housing 161. These various surfaces serve ast thrust surfaces for pinion 171 during this agitation operation in a method of cooperation which is similar to that occurring between collar 79 and surface 78 of the first embodiment.

During the fluid extraction operations in which motor 15 is reversed so as to rotate pulley 18 in a clockwise direction, this latter pulley is caused to climb helix 55 and lift the brake rotor 46 away from brake stator 49 in an identical manner to that illustrated in the first embodiment of FIGURES 1–9. It will be noted that the geared connections to the upper end of shaft 38a provide sufficient inertia to restrain shaft 38a from rotation so that pulley 18 may climb helix 55 during this short interval at the beginning of the fluid extraction operation.

As in the first embodiment, the large force transmitted by spring 52 to brake stator 49 during the agitation operations is transmitted to center shaft 38a through helix 55 as soon as rotor 46 has been lifted away from the upper surface of stator 49. The resulting tension created in shaft 38a tends to pull that shaft downwardly and compress washers 191 and 192 between pinion 171 and the adjacent portions of gear case 161. Continued rotary motion imparted to shaft 38a clutches this shaft to spin shaft 37a through pinion 171, housing 161 and clutch members 191 and 192 and creates a drive path between pulley 18 and the clothes receptacle 107 which is brought up to full speed once this clutching operation takes place.

While two washers 191 and 192 have been shown in this second embodiment, it is within the scope of this invention to vary the clutch surface area presented between pinion 171 and gear housing 161 by eliminating one or both of washers 191 and 192 as well as increasing the number and different types of washers used in this clutching arrangement.

I claim:

1. A drive assembly comprising, first and second coaxially aligned shafts, a drive member mounted on one of said shafts for rotating said one shaft, reversible drive means for driving said drive member in a first and second direction, means defining contacting clutch surfaces connected respectively to said first and second shafts to provide thrust bearing surfaces to carry thrust forces between said shafts in said first direction of rotation, and means for applying additional thrust forces to said surfaces for frictionally coupling said clutch surfaces together upon rotation of said drive member in said second direction for rotating said first and second shafts in unison in said second direction.

2. A drive assembly comprising, a support member, a first shaft journaled in said support member for rotation relative to said support member, a rotor splined on said first shaft, means limiting axial movement of said first shaft relative to said support member, a brake member positioned adjacent said rotor and connected to said support member, bias means urging said rotor into engagement with said brake member to restrain rotation of said first shaft relative to said brake member, a second shaft coaxially aligned with said first shaft, means defining a first clutch surface connected to said first shaft, means defining a second clutch surface connected to said second shaft and constantly contacting said first clutch surface to limit axial movement between said first and second shafts, and a reversible drive member threadedly mounted on said second shaft and adapted to move toward said rotor against the action of said bias means to simultaneously separate said rotor from said brake member and couple said clutch surfaces together to form a driving connection between said first and second shafts.

3. A drive assembly comprising, a first shaft, brake means positioned adjacent said first shaft, a second shaft coaxially aligned with said first shaft, a brake rotor mounted on said first shaft for restricted axial movement thereon, means urging said brake rotor into contact with said brake means to restrain rotation of said first shaft, means connected to said first shaft defining a first clutch surface, means connected to said second shaft defining a second clutch surface constantly contacting said first clutch surface, and revoluble power input means threaded on said second shaft and adapted to move toward said brake rotor for simultaneously separating said brake rotor from said brake means and frictionally coupling said shafts together through said clutch surfaces during the rotation of said power input means.

4. A drive assembly comprising, a pair of coaxially aligned revoluble shafts, means defining constantly contacting surfaces between said shafts limiting axial movement of said shafts with respect to each other, brake means limiting rotational movement of one of said shafts, a brake rotor mounted on said one shaft for restricted axial movement relative to said one shaft, spring means urging said brake rotor into contact with said brake means for restraining said one shaft from rotation, and drive means threadedly mounted on the other of said shafts and adapted to move said brake rotor away from said brake means and clutching said contacting surfaces together under the urging of said spring means to form a driving connection between said shafts in one direction of rotation.

5. A drive assembly comprising, a revoluble member, a rotor slideably mounted on said revoluble member for axial movement relative thereto, a brake member positioned adjacent said rotor, means limiting axial movement of said revoluble member relative to said brake member, bias means urging said rotor into engagement with said brake member to restrain rotation of said revoluble member relative to said brake member, a shaft coaxially aligned with said revoluble member, means defining a first clutch surface connected to said revoluble member, means defining a second clutch surface connected to said shaft and constantly engaging said first clutch surface to limit axial movement of said shaft relative to said revoluble member, and a revoluble driving member threaded on said shaft and adapted to move toward said rotor against the action of said bias means to simultaneously separate said rotor from said brake member and frictionally engage said clutch surfaces to form a driving connection between said shaft and said revoluble member during the rotation of said driving member.

6. A drive assembly comprising, a support member, a first shaft journaled in said support member for rotation within said support member, a rotor keyed to said first shaft for axial movement relative thereto, means limiting axial movement of said first shaft relative to said support member, a brake member positioned adjacent said rotor and connected to said support member, bias means urging said rotor into engagement with said brake member to restrain rotation of said first shaft relative to said brake rotor, a second shaft coaxially aligned with said first shaft, means defining a first clutch surface connected to said first shaft, means defining a second clutch surface connected to said second shaft and constantly contacting said first clutch surface to form a thrust bearing between said first and second shafts, and a revoluble driving member threaded on said second shaft and adapted to move toward said rotor to simultaneously separate said rotor from said brake member and frictionally couple said first and second clutch surfaces together to form a driving connection between said first and second shafts.

7. A drive assembly comprising, a first shaft, a second shaft revolubly mounted within said first shaft, means connected to said first shaft defining a first clutch surface, means connected to said second shaft defining a second clutch surface contacting said first clutch surface to provide a thrust bearing for said second shaft during the rotation of said second shaft relative to said first shaft, a brake member, a brake rotor connected to said first shaft and axially slideable thereon, spring means biasing said brake rotor into engagement with said brake member to restrain rotation of said first shaft, a reversible driving member mounted on said second shaft, and cam means on said second shaft adapted to move said driving member toward and away from said brake rotor during the rotation of said driving member, said driving member being revoluble in one direction to rotate said second shaft relative to said first shaft in said thrust bearing and being revoluble in an opposite direction to move said rotor away from said brake member and cause said spring means to frictionally couple said first shaft with said second shaft through said clutch surfaces.

8. A drive assembly comprising, a first shaft, a second shaft revolubly mounted within said first shaft, means connected to said first shaft defining a first clutch surface, means connected to said second shaft defining a second clutch surface contacting said first clutch surface in a sliding engagement during the rotation of said second shaft relative to said first shaft, a brake member positioned adjacent said first shaft, a rotor splined on said first shaft for axial movement thereon, spring means biasing said rotor against said brake member to restrain rotation of said first shaft, a helix on said second shaft, a reversible drive member threaded on said helix and adapted to axially move toward and away from said rotor during the rotation of said drive member, and a stop member on said second shaft, said drive member being revoluble in one direction against said stop member to rotate said second shaft on said surfaces relative to said first shaft and being revoluble in an opposite direction to cam said rotor away from said brake member and couple said second shaft to said first shaft through said surfaces under the bias of said spring means.

9. A drive assembly comprising, a pair of upstanding inner and outer concentric shafts, means defining a thrust bearing supporting said inner shaft on said outer shaft for rotation relative to said outer shaft, a support member, means supporting said outer shaft for rotation relative to said support member, means defining a brake surface connected to said support member, a rotor connected to said outer shaft and mounted for axial movement relative to said outer shaft, spring means positioned between said support member and said rotor and biasing said rotor downwardly against said brake surface to restrain rotation of said outer shaft relative to said support member, a reversible power input member mounted on said inner shaft for rotating said inner shaft in either of two directions, a second thrust bearing positioned between said rotor and said input member, and cam means on said inner shaft adapted for axially moving said input member toward and away from said rotor during the rotation of said input member in said directions, said input member being axially movable by said cam means toward said rotor during the rotation of said input member in one direction to separate said rotor and said brake surface and frictionally couple said shafts together through said thrust bearing under the bias exerted by said spring means on said thrust bearing as a result of the separation of said rotor from said brake surface.

10. A drive assembly comprising, a pair of upstanding inner and outer concentric shafts, means defining a first thrust bearing supporting said inner shaft on said outer shaft for rotation relative to said outer shaft, a support member, means supporting said outer shaft for rotation relative to said support member, means defining a brake surface connected to said support member, a rotor connected to said outer shaft and mounted for axial movement relative to said outer shaft, spring means positioned between said support member and said rotor and biasing said rotor downwardly against said brake surface to restrain rotation of said outer shaft relative to said support member, a reversible power input chamber mounted on said inner shaft for rotating said inner shaft in either of two directions, a second thrust bearing positioned between said rotor and said input member, and cam means on said inner shaft and adapted to axially move said input member toward and away from said rotor during the rotation of said input member in said directions, said second thrust bearing being axially movable by said cam means against said rotor during the rotation of said input member in one direction to separate said rotor from said brake surface and frictionally couple said shafts together through said first thrust bearing under the bias exerted by said spring means on said first thrust bearing as a result of the separation of said rotor from said brake surface.

11. A drive assembly comprising upstanding inner and outer concentric shafts, means connected to said outer shaft defining an inverted frusto-conical bearing surface, a frusto-conical member affixed to said inner shaft and resting on said bearing surface to support said inner shaft on said outer shaft, a support member journaling said outer shaft in an upstanding position, means defining a brake stator connected to said support member, a brake rotor keyed to said outer shaft for axial movement thereon, a spring positioned between said support member and said rotor and biasing said rotor against said stator to restrain rotation of said outer shaft, said inner shaft including an end portion provided with a helix and a stop member, a reversible drive member threaded on said helix for axial movement on said inner shaft during rotary movements of said drive member, a thrust bearing positioned between said rotor and said drive member for engagement with said rotor, said drive member being revoluble in one direction for movement against said stop member to rotate said inner shaft relative to said outer shaft on said bearing surface and being revoluble in an opposite direction to move said thrust bearing against said rotor to separate said rotor from said stator and couple said shafts together through said frusto-conical member and said bearing surface under the bias of said spring.

References Cited in the file of this patent

UNITED STATES PATENTS

| | | |
|---|---|---|
| 690,552 | Beck | Jan. 7, 1902 |
| 1,502,677 | Law | July 29, 1924 |
| 1,694,810 | Dunham | Dec. 11, 1928 |
| 2,028,500 | Cook et al. | Jan. 21, 1936 |
| 2,366,236 | Clark | Jan. 2, 1945 |
| 2,391,955 | Eason | Jan. 1, 1946 |
| 2,629,469 | Dayton | Feb. 24, 1953 |
| 2,826,056 | Bruckman | Mar. 11, 1958 |